United States Patent [19]
Gay

[11] Patent Number: 5,627,890
[45] Date of Patent: May 6, 1997

[54] TELEPHONE LINE INTERFACE CIRCUIT

[75] Inventor: Michael J. Gay, Vaud, Switzerland

[73] Assignee: Motorola, Inc., Schaumburg, Ill.

[21] Appl. No.: 419,300

[22] Filed: Apr. 10, 1995

[30] Foreign Application Priority Data

Apr. 26, 1994 [GB] United Kingdom ............ 9408251

[51] Int. Cl.$^6$ ............................ H04M 1/58; H04M 19/00
[52] U.S. Cl. ............................................ 379/399; 379/413
[58] Field of Search ................................. 379/399, 395, 379/387, 413, 412, 414, 416

[56] References Cited

U.S. PATENT DOCUMENTS

| | | | |
|---|---|---|---|
| 4,309,574 | 1/1982 | Sublette et al. | 379/387 X |
| 4,748,664 | 5/1988 | Blomley | 379/387 X |
| 4,796,295 | 1/1989 | Gay et al. | 379/395 X |
| 4,953,207 | 8/1990 | Van Dongen et al. | 379/395 |
| 5,239,579 | 8/1993 | Schuh | 379/395 |
| 5,384,842 | 1/1995 | Tapping et al. | 379/387 |

FOREIGN PATENT DOCUMENTS

| | | | |
|---|---|---|---|
| 0107133 | 10/1983 | European Pat. Off. | H04M 19/08 |
| 2183964 | 6/1989 | United Kingdom | H04M 1/00 |

*Primary Examiner*—Ahmad F. Matar
*Assistant Examiner*—T. Devendra Kumar
*Attorney, Agent, or Firm*—Rennie William Dover

[57] ABSTRACT

In a telephone line interface circuit, a first transistor (Q1) is arranged in series in the signal line (3) and a second transistor (Q2) is arranged in parallel across the telephone line (3, 4), both transistors being controlled from a control circuit (5), so that, when the voltage across the telephone line falls below that required to keep the first transistor (Q1) in normal conduction, the second transistor (Q2) maintains the signal path. In order to reduce cross-over distortion, a negative feedback loop (Q5, R1, Q3, Q1) and supply voltage sensing means (6) controls the first transistor (Q1) so that it conducts only sufficient quiescent current to power the circuit, any remaining current being conducted by the second transistor (Q2), thereby maintaining both transistors in conduction down to low quiescent line current levels.

8 Claims, 2 Drawing Sheets

TELEPHONE LINE INTERFACE CIRCUIT

FIELD OF THE INVENTION

This invention relates to telephone line interface circuits.

BACKGROUND OF THE INVENTION

Telephone equipment connected to a telephone line must often be powered from the telephone line itself. An interface circuit is then required to absorb the necessary energy while at the same time presenting the d.c. and a.c. characteristics of the equipment.

In one known arrangement, a transistor, controlled by a feedback loop, is provided in series with the telephone line. The problem with this arrangement is that, at times, the telephone line voltage may fall below that required to power the circuit. The a.c. and d.c. characteristics can then no longer be maintained. This problem has been solved in the Motorola TCA3386 and TCA3388 circuits by adding a further transistor arranged to become conducting in these circumstances. However, some performance is lost due to crossover distortion occurring as the line current switches between the two transistors.

BRIEF SUMMARY OF THE INVENTION

It is therefore an object of the present invention to provide a telephone line interface circuit which overcomes, or at least reduces, the above problems.

Accordingly, the invention provides a telephone line interface circuit for transmitting signals to and receiving signals from a telephone line, the interface circuit comprising first conduction means including first and second terminals in series between the telephone line and storage and voltage regulator means and a control terminal, second conduction means including first and second terminals coupled in parallel across the telephone line and a control terminal, control means coupled to the control terminals of the first and second conduction means for presenting predetermined a.c. and d.c. characteristics to the telephone line by modulation of the current in the first and second conduction means, and a negative feedback loop responsive to signals from the storage and voltage regulator means for controlling the first conduction means so that the first conduction means conducts only sufficient quiescent current to power the circuit, any remaining current being conducted by the second conduction means.

In a preferred embodiment, the control means provides a common control signal to the control terminals of the first and second conduction means. Preferably, the negative feedback loop operates by establishing an offset voltage between the common control signal and the control terminal of said first conduction means.

In one embodiment, the first conduction means is able to conduct in both directions. In this case, a non-linear auxiliary feedback loop responsive to current flow through the first conduction means is preferably provided so as to modify said offset voltage to limit the current in one direction through the first conduction means, while having substantially no effect on current flow in the other direction.

BRIEF DESCRIPTION OF THE DRAWINGS

Two embodiments of the invention will now be more fully described, by way of example, with reference to the drawings, of which.

DETAILED DESCRIPTION

Figure 1:
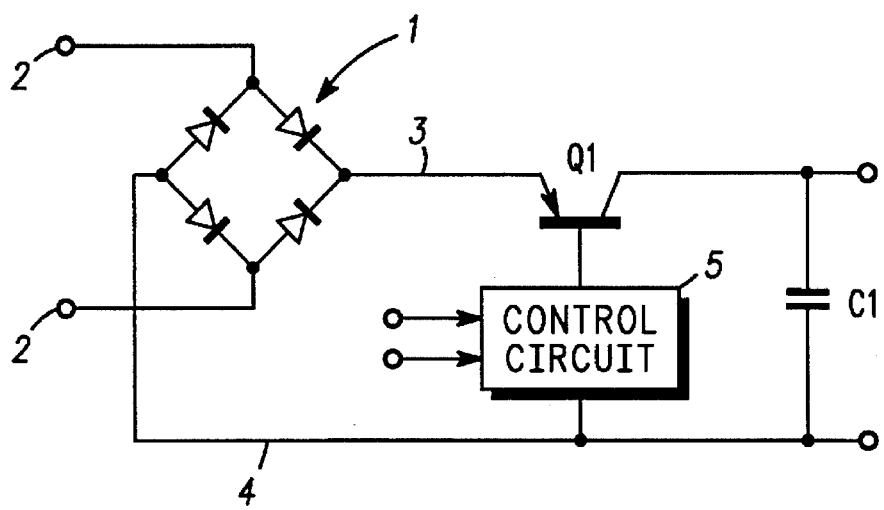
FIG. 1 shows a schematic diagram of one example of a known arrangement.

Thus, as shown in FIG. 1, a known interface circuit includes a standard diode bridge arrangement 1 having first and second input terminals coupled to the two lines forming the telephone line 2, and positive and negative output terminals coupled to a so-called speech circuit via lines 3 and 4. The speech circuit includes a pnp transistor Q1 having its emitter electrode coupled to the positive output terminal of the diode bridge via line 3 and its collector electrode coupled to the negative output terminal of the diode bridge via shunt regulating means (not shown) and parallel reservoir capacitor C1, which provide a power supply for the rest of the circuit. The conduction of transistor Q1 is controlled by a feedback control circuit 5 having inputs responsive to the voltage V and current I on the telephone line 2, such that the a.c. and d.c. characteristics presented to the telephone line 2 are dictated by regulation of the emitter current of transistor Q1 while the d.c. component of the current is used to power the circuit.

Figure 2:
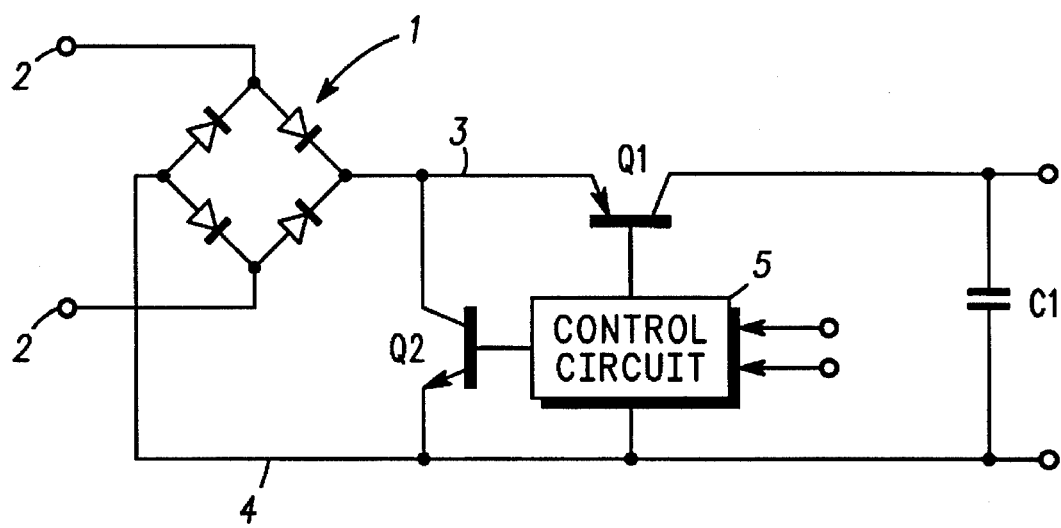
FIG. 2 shows a schematic diagram of a second example of a known arrangement.

However, at times, the output voltage from the diode bridge 1 may be required, due to the modulation of the signal on signal line 3, to fall below the level required to power the circuit and established on reservoir capacitor C1. The required a.c. and d.c. specifications can then no longer be respected. This problem has been resolved, for example in Motorola Circuits Nos TCA3386 and TCA3388, by adding a second transistor Q2 coupled across lines 3 and 4 and also controlled by control circuit 5. This is shown in FIG. 2. This solution does not provide a very good performance in all circumstances, however, because of crossover distortion ocurring as the line current commutes between the two transistors Q1 and Q2.

Figure 3:
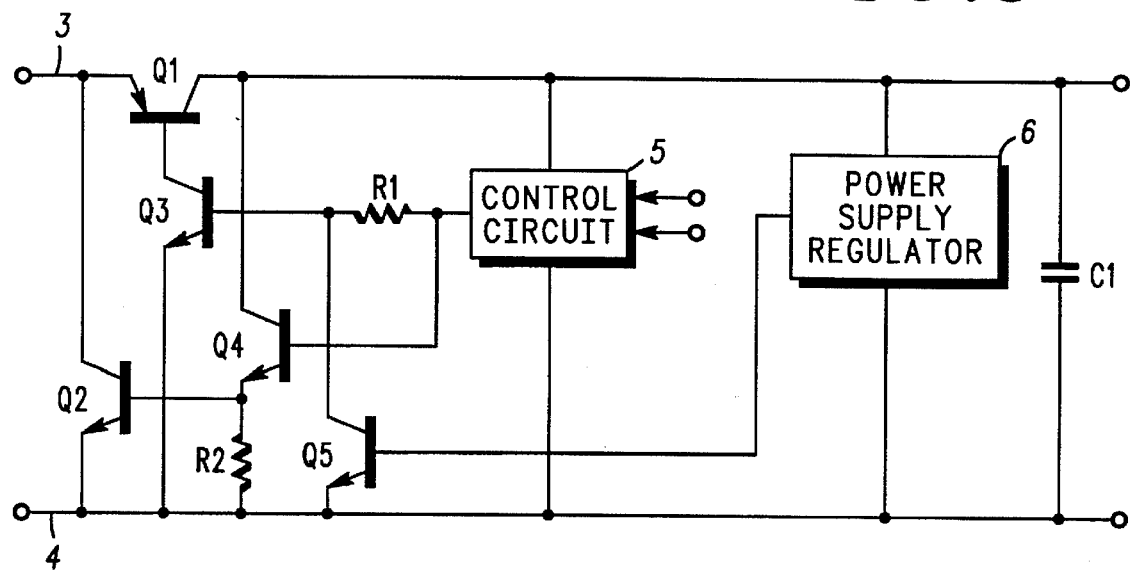
FIG. 3 shows a schematic diagram of a first embodiment according to the present invention.

As shown in FIG. 3, in which the same elements as in FIGS. 1 and 2 have the same reference numerals, according to one embodiment of the invention, transistors Q1 and Q2 are controlled so that both are in conduction under quiescent conditions so that the drive voltage variations required to commute the current between them are minimized. Thus, the bases of transistors Q1 and Q2 are coupled to be driven by respective transistors Q3 and Q4 from a common output from the control circuit 5. A resistor R1 is coupled between the base of transistor Q3 and the output of control circuit 5 with a transistor Q5 coupled between the base of transistor Q3 and reference line 4 so that the drive to transistor Q3 is offset by a voltage developed across resistor R1 by the current drawn by transistor Q5. The base of transistor Q5 is coupled to a power supply regulator 6 of the circuit, which controls the current drawn by transistor Q5 such that the current will increase when the supply voltage increases.

The voltage drop across resistor R1 is:

$$V_{R1} = (V_{be})_{Q2} + (V_{be})_{Q4} - (V_{be})_{Q3}$$

where $(V_{be})_{Q2}$ is the base emitter voltage of transistor Q2;

$(V_{be})_{Q3}$ is the base emitter voltage of transistor Q3; and $(V_{be})_{Q4}$ is the base emitter voltage of transistor Q4.

The circuit is designed so that, under quiescent conditions, when the supply voltage is at a desired value, the current in transistor Q5 controls $(V_{be})_{Q3}$ so that transistor Q3 provides only the base current needed by transistor Q1 to supply the circuit and thus maintain the supply voltage. The surplus line current is absorbed by transistor Q2.

Transistor Q4 is biased by a resistor R2 coupled between the base and emitter of transistor Q2, so that it operates at near constant current. A.c. signals on the telephone line thus modulate equally the currents in transistors Q2 and Q3 due to the exponential characteristic of bipolar transistors. Provided that transistor Q1 remains out of saturation at all times, the operating conditions are therefore that transistor Q1 is biased at the supply current required, transistor Q2 absorbs the remaining line current and the telephone line signal current is divided between these transistors in the ratio of the bias currents. Transistor Q2 will, accordingly, always be in conduction provided that the quiescent line current exceeds the current needed to power the circuit.

For large signals, the voltage at the diode bridge 1 output may fall below the supply voltage required, so that transistor Q1 can no longer operate normally. The overall feedback loops (not shown) will then automatically increase the drive level so that transistor Q2 absorbs the current which transistor Q1 no longer conducts. Provided that the quiescent line current sufficed to power the circuit, transistor Q2 was already in conduction. The cross-over distortion will thus be low.

If transistor Q1 has a low inverse β, the current through transistor Q3, which corresponds to the base current in transistor Q1, will increase proportionally to the current through transistor Q2 and simply draw a small current from the reservoir capacitor C1. Thus no further elements are necessary.

Figure 4:
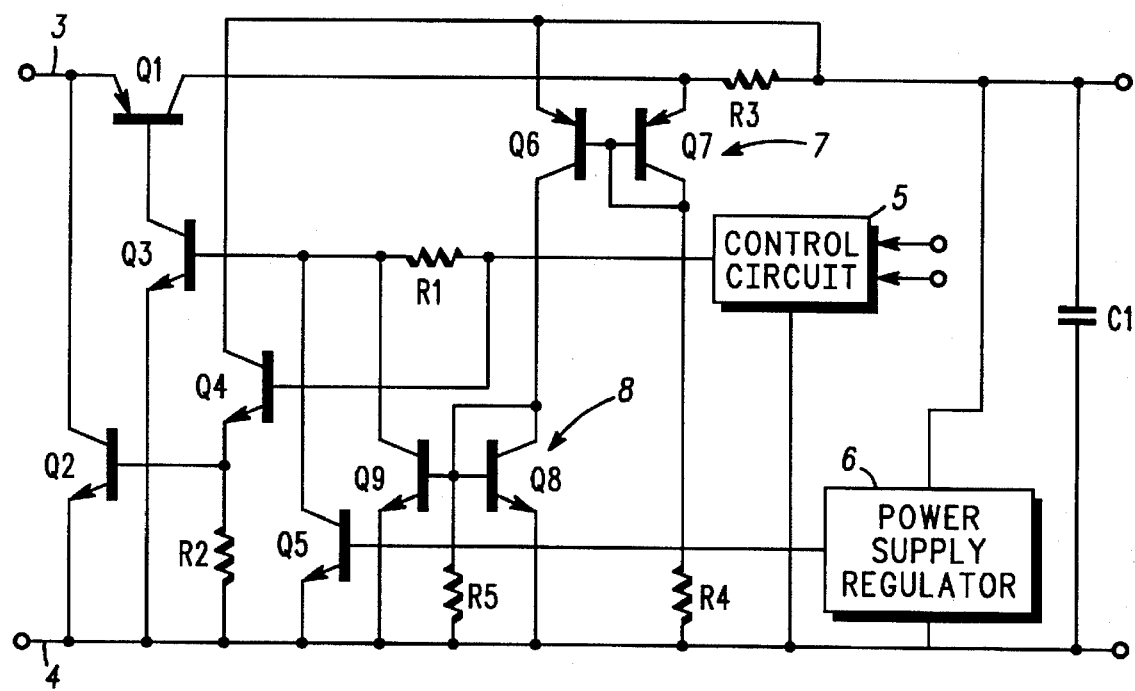
FIG. 4 shows a schematic diagram of a second embodiment according to the present invention.

However, if transistor Q1 has a high inverse β, then the current drawn from the reservoir capacitor C1 may become excessive. To prevent this, an auxiliary feedback loop can be added, as shown in FIG. 4.

Here, a small resistor R3 is provided between the collector of transistor Q1 and the reservoir capacitor C1. A pnp current mirror 7 formed by transistors Q6 and Q7 is coupled across the resistor R3 to receive the voltage developed across the resistor R3 as a differential emitter voltage. A resistor R4 biases the current mirror 7. The current mirror 7 supplies a current to an npn current mirror 8 formed by transistors Q8 and Q9 and to a bypass resistor R5 coupled from the bases of transistors Q8 and Q9 to the reference line 4. The current mirror 8 is arranged so that the collector current of transistor Q9 is drawn through resistor R1, across which the offset voltage between transistors Q4 and Q5 is developed.

Thus, when transistor Q1 is conducting in the normal mode, transistor Q6 is biased to a lower current than transistor Q7 and the circuit is arranged so that the collector current of transistor Q6 is insufficient to develop a voltage across resistor R5 sufficient to bring transistor Q9 into conduction. Thus, the loop is inactive in normal mode.

However, when transistor Q1 conducts in inverse mode, the current through transistor Q6 is increased and the circuit is arranged so that transistor Q9 becomes conducting and so limits the drive to transistor Q3 and thus to transistor Q1 to a low level.

It will be appreciated that, although two embodiments of the invention have been described in detail, various modifications and improvements can be made by a person skilled in the art without departing from the scope of the present invention.

What I claim is:

1. A telephone line interface circuit for transmitting signals to and receiving signals from a telephone line, the interface circuit comprising first conduction means including first and second terminals in series between the telephone line and storage and voltage regulator means and a control terminal, second conduction means including first and second terminals coupled in parallel across the telephone line and a control terminal, control means coupled to the control terminals of the first and second conduction means for presenting predetermined a.c. and d.c. characteristics to the telephone line by modulation of the current in the first and second conduction means, and a negative feedback loop responsive to signals from the storage and voltage regulator means for controlling the first conduction means so that the first conduction means conducts only sufficient quiescent current to power the circuit, any remaining current being conducted by the second conduction means, wherein the control means provides a common control signal to the control terminals of the first and second conduction means.

2. A telephone line interface circuit according to claim 1, wherein the negative feedback loop operates by establishing an offset voltage between the common control signal and the control terminal of said first conduction means.

3. A telephone line interface circuit according to claim 1, wherein the first conduction means is able to conduct in both directions.

4. A telephone line interface circuit according to claim 1, wherein the first conduction means comprises a transistor having its emitter and collector electrodes coupled in series between the telephone line and the storage and voltage regulator means.

5. A telephone line interface circuit according to claim 1, wherein the second conduction means comprises a transistor having its emitter and collector electrodes coupled in parallel across the telephone line.

6. A telephone line interface circuit according to claim 1, wherein the storage and voltage regulator means comprises a voltage regulator and a reservoir capacitor coupled in parallel across the telephone line.

7. A telephone line interface circuit according to claim 1, wherein the first conduction means is able to conduct in both directions.

8. A telephone line interface circuit according to claim 7, futher comprising a non-linear auxiliary feedback loop responsive to current flow through the first conduction means so as to modify said offset voltage to limit the current in one direction through the first conduction means, while having substantially no effect on current flow in the other direction.

* * * * *